J. F. FLAHERTY.
ROLLER BEARING.
APPLICATION FILED NOV. 13, 1919.

1,404,383. Patented Jan. 24, 1922.
2 SHEETS—SHEET 1.

Inventor
JOHN F. FLAHERTY.
Attorney

J. F. FLAHERTY.
ROLLER BEARING.
APPLICATION FILED NOV. 13, 1919.

1,404,383.

Patented Jan. 24, 1922.
2 SHEETS—SHEET 2.

Inventor
JOHN F. FLAHERTY.

Attorney

UNITED STATES PATENT OFFICE.

JOHN F. FLAHERTY, OF TOLEDO, OHIO, ASSIGNOR TO THE BOCK BEARING COMPANY, OF TOLEDO, OHIO, A CORPORATION OF OHIO.

ROLLER BEARING.

1,404,383.

Specification of Letters Patent. Patented Jan. 24, 1922.

Application filed November 13, 1919. Serial No. 337,693.

*To all whom it may concern:*

Be it known that I, JOHN F. FLAHERTY, a citizen of the United States, and a resident of Toledo, county of Lucas, State of Ohio, have invented certain new and useful Improvements in Roller-Bearings, of which the following is a specification.

This invention relates to cages for roller bearings and especially to cages for taper roller bearings. One of the objects of the invention is to provide a simple cage construction which may be formed in one piece from sheet metal and which will be adapted to hold the rollers in proper alinement and permanently assembled with the inner member of the bearing. Another object of the invention is to provide a cage of the type referred to which will be rigid, capable of withstanding rough usage and which may be economically manufactured with dies of simple construction and with a minimum number of operations.

Other objects and the features of novelty will be apparent from the following description, taken in connection with the accompanying drawings, in which:—

Figure 1:
Figure 1 is a transverse section of a blank from which the cage embodying my invention is made.
Figure 2:
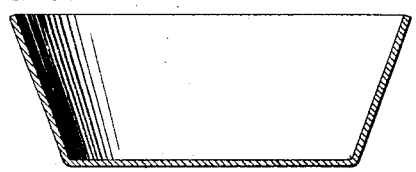
Fig. 2 is a transverse section of a cup into which the blank shown in Fig. 1 is formed by the first operation.
Figure 3:
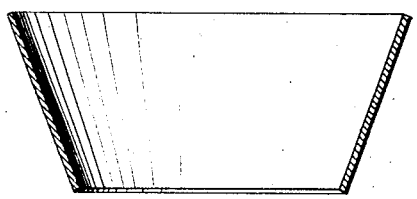
Fig. 3 is a transverse section of a conical tube which may be used in forming the cage in place of the blank shown in Fig. 1.

Referring to the drawings, 20 indicates a circular blank of sheet metal of suitable thickness to form a cage having the requisite characteristics as to rigidity and strength. By means of a cupping operation, made on a stamping press with dies of ordinary construction, the blank shown in Fig. 1 is converted into the cup shown in Fig. 2. The next operation is to punch a circular opening 21 in the bottom of the cup shown in Fig. 2 and to form the flange 22 at the small end of the cone, this flange being turned substantially at right angles to the side wall of the cone. When a conical tube, such as is shown in Fig. 3, is employed as the initial blank, in place of the circular disc 20, the first operation is to turn in the flange 22 at the small end of the cone to produce the structure shown in Fig. 4. From this point on, the operations are the same for both methods of forming.

Figure 4:
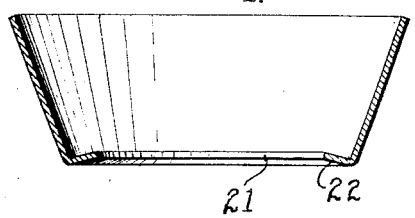
Fig. 4 is a transverse section of the cage after the next operation on the part shown in Fig. 1 or the blank shown in Fig. 3.
Figure 5:
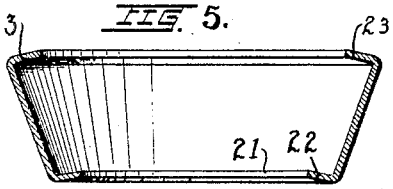
Fig. 5 is a transverse section of the cage after the next operation upon the part shown in Fig. 4.
Figure 6:
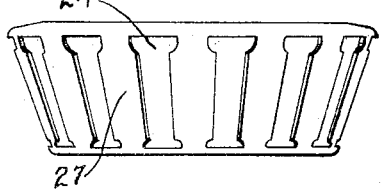
Fig. 6 is a side elevation of the cage after the next operation on the part shown in Fig. 5.
Figure 7:
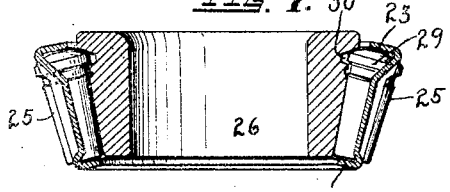
Fig. 7 is a transverse section of the cage in finished form and assembled with the rollers and inner bearing member.
Figure 8:
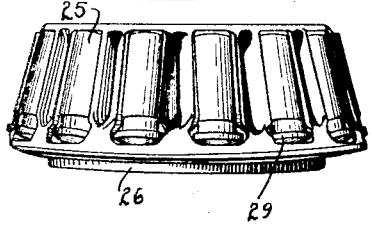
Fig. 8 is a side elevation of the parts shown in Fig. 7.
Figure 9:
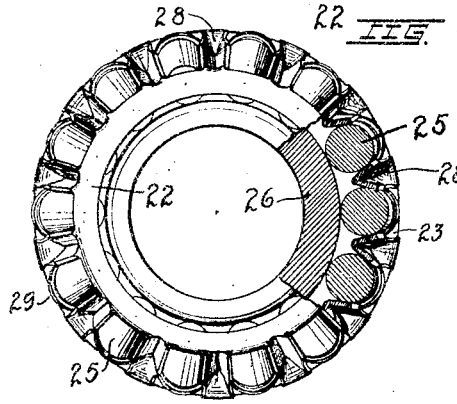
Fig. 9 is an end elevation of the same with parts shown in section on the line 9—9 of Fig. 7.

The cage, as it appears in Fig. 4, is next provided with a flange 23 at its larger end, as shown in Fig. 5, this operation being performed on a stamping press, or by spinning. The windows or openings 24 are next punched in the side wall of the cage, there being one such opening for each of the rollers which the cage is to carry. The rollers 25 are then assembled in the openings 24 of the cage and the inner bearing member or cone 26 is placed in its proper position. Then, by means of suitable radially acting dies, the bridging members 27 between the openings 24 are crimped in between the rollers, thereby converting the substantially flat section shown in Fig. 6 to a channel-shaped V-shaped structure, such as is indicated at 28 in Fig. 9, the ends of the channels in the bridging members being located between the end flanges 22 and 23. From Fig. 7, it will be noted that the bridging members 27, in addition to being crimped, are also pressed inwardly, so as to closely confine the rollers. Each of the rollers has an enlarged head 29 at one end which enters a circumferential groove 30 in the cone 26, and the cage so confines the heads of the rollers in the groove 30 that the rollers and cage will be maintained in assembled relation with the cone 26.

Figure 10:
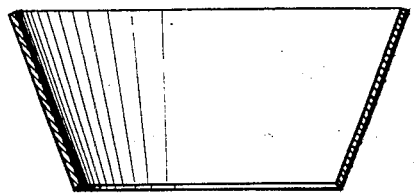
Fig. 10 is a transverse section of a conical tube, the same as shown in Fig. 3.
Figure 11:
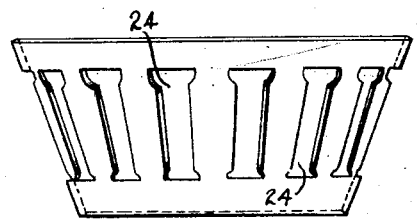
Fig. 11 is a side elevation of the same after the next operation of forming the cage by an alternative method.
Figure 12:
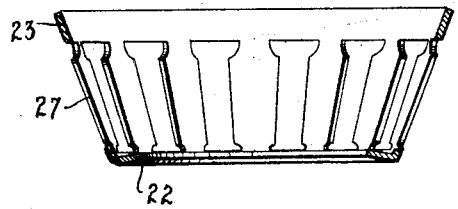
Fig. 12 is a transverse section of the cage after the next operation on the same as shown in Fig. 11.
Figure 13:
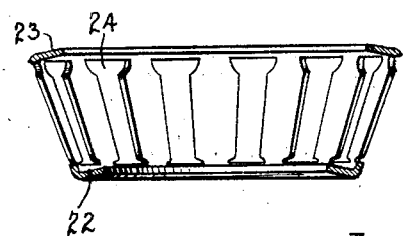
Fig. 13 is a transverse section of the cage after the next operation on the same as it appears in Fig. 12.

As an alternative method of forming the cage, the blank shown in Fig. 10 may be employed, the first operation being to provide the openings 24, as shown in Fig. 11; by the succeeding operation, the flange 22 is formed at the small end of the cage, as shown in Fig. 12, and by the next operation, the flange 23 is formed at the larger end of the cage. This provides a structure similar to that illustrated in Fig. 6, and the final operation may be the same as previously described. The finishing of the cage, from the stage shown in Fig. 12, may be done by crimping the bridging members 27, as the next operation, instead of turning down the flange 23. The rollers and cone being then assembled with the cage, the final operation will be to throw down the flange 23.

Having thus described my invention, what I claim is:—

1. In roller bearings, the combination of an inner race member having a groove adjacent one end, rollers having enlargements adapted to run in said groove, and a cage for spacing said rollers and maintaining them in assembled relation with said race member, said cage being formed of a single piece of sheet metal and comprising end flanges and having openings through which the bodies of said rollers and said enlargements project outwardly and bridging members connecting said flanges and each formed exteriorly with a longitudinal depression.

2. In roller bearings, the combination of an inner race member having a groove adjacent one end, rollers having enlargements adapted to run in said groove, and a cage for spacing said rollers and maintaining them in assembled relation with said race member, said cage being formed of a single piece of sheet metal and comprising end flanges and having openings through which the bodies of said rollers and said enlargements project outwardly and bridging members connecting the outer edges of said flanges and each formed exteriorly with a longitudinal depression the ends of which are between said flanges.

3. A roller bearing cage formed of a single piece of sheet metal and comprising continuous circular end members and roller-spacing bridging members connecting with said end members at points radially outward of the position of the roller axes and each formed exteriorly with a longitudinal depression the ends of which are spaced from said end members whereby a substantially V-shaped cross-section is produced throughout the major portion of the length of the bridging member.

4. A roller bearing cage formed of a single piece of sheet metal and comprising radially extending flanges at its ends, the outer edges of which are connected by bridging members each formed exteriorly with a longitudinal depression, the ends of which depression are spaced from said flanges.

5. A roller bearing cage formed of a single piece of sheet metal and comprising radially extending flanges at its ends, the outer edges of which are connected by roller-spacing bridging members, each of which is formed exteriorly between points spaced from said end members with a longitudinal depression which gives to the bridging member a substantially V-shaped cross-section through the major portion of its length.

In testimony whereof I affix my signature.

JOHN F. FLAHERTY.